United States Patent [19]

Wolff

[11] Patent Number: 5,248,789

[45] Date of Patent: Sep. 28, 1993

[54] EPOXY SILICONE

[75] Inventor: Andrew R. Wolff, Lake Villa, Ill.

[73] Assignee: PPG Industries, Inc., Pittsburgh, Pa.

[21] Appl. No.: 963,644

[22] Filed: Oct. 20, 1992

Related U.S. Application Data

[63] Continuation-in-part of Ser. No. 857,898, Mar. 26, 1992, abandoned.

[51] Int. Cl.$^5$ ............................................ C07D 303/18
[52] U.S. Cl. .................................................... 549/215
[58] Field of Search ........................................ 549/215

[56] References Cited

U.S. PATENT DOCUMENTS

| | | | |
|---|---|---|---|
| 2,803,615 | 8/1957 | Ahlbrecht et al. | 260/29.6 |
| 3,215,648 | 11/1965 | Duffy et al. | 260/2.5 |
| 4,004,059 | 1/1977 | Delner et al. | 428/224 |
| 4,046,930 | 9/1977 | Johnson et al. | 427/387 |
| 4,083,856 | 4/1978 | Mendicino | 260/348.12 |
| 4,533,477 | 8/1985 | Preiner et al. | 252/8.9 |
| 4,537,944 | 10/1985 | Imai et al. | 528/18 |
| 4,546,164 | 10/1985 | Shen et al. | 528/15 |
| 4,625,010 | 11/1986 | Huhn et al. | 528/31 |
| 4,666,745 | 5/1987 | Huhn et al. | 427/393.4 |
| 4,902,739 | 2/1990 | Ona et al. | 524/588 |
| 4,954,580 | 9/1990 | Zahir | 525/476 |
| 4,990,546 | 2/1991 | Eckberg | 522/170 |
| 5,115,069 | 5/1992 | Motegi et al. | 52.8/15 |

FOREIGN PATENT DOCUMENTS

| | | | |
|---|---|---|---|
| 430102 | 6/1991 | European Pat. Off. | 549/215 |
| 2012012 | 3/1970 | France | 549/215 |
| 52-93718 | 8/1977 | Japan . | |
| 1-221457 | 9/1989 | Japan . | |
| 2232157 | 12/1990 | United Kingdom | 549/215 |

Primary Examiner—Joseph E. Evans
Attorney, Agent, or Firm—George D. Morris

[57] ABSTRACT

Compounds represented by the formulae:

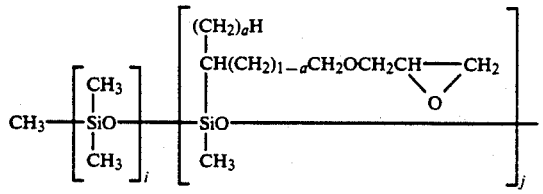

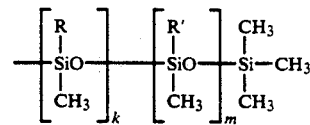

wherein:
(a) each R in the compound is independently 1-phenylethyl, 2-phenylethyl, 2-phenylpropyl, or 1-methyl-1-phenylethyl;
(b) each R' in the compound is independently alkyl containing from 6 to 18 carbon atoms;
(c) the average value of a is in the range of from 0 to 1;
(d) the value of i is an integer in the range of from 0 to about 200;
(e) the value of j is an integer in the range of from about 2 to about 20;
(f) the value of k is an integer in the range of from about 2 to about 60;
(g) the ratio k/j is in the range of from 1 to about 10;
(h) the sum of the values of i, j, k, and m is in the range of from about 10 to about 280; and
(i) the value of m is an integer such that m/(j+k+m) is in the range of from 0 to about 0.15.

provide satisfactory scratch and mar resistance to many coatings and are bloom-resistant. The low bloom markedly improves paintability of the coatings. Moreover, the silicone-based compounds have high refractive indices. Since the refractive index of a coating depends upon the refractive indices of its components, these silicone-based compounds are useful as components of high gloss coatings.

36 Claims, No Drawings

EPOXY SILICONE

This application is a continuation-in-part of Application Ser. No. 07/857,898, filed Mar. 26, 1992, now abandoned.

BACKGROUND OF THE INVENTION

Many different silicones are known to provide abrasion, scratch, and mar resistance to coatings. In most cases they tend to bloom, that is, over a period of time they tend to migrate to the surfaces of the coatings of which they are constituents, where they can be removed by wiping, washing, or the like. Not only does this effectively remove the beneficial properties the silicones provide to the coatings, but residual bloom often substantially interferes with paintability and hence with recoating or repair coating operations.

Another important property of coatings is gloss. For many coatings, especially automotive coatings, high gloss is a very desirable property. Gloss is a function of refractive index such that an increase in the refractive index of the coating results in higher gloss.

THE INVENTION

Silicone-based compounds have now been discovered that provide satisfactory scratch and mar resistance to many coatings and are bloom-resistant. The chemical structures of the silicone-based compounds and their low bloom markedly improve the paintability of coatings containing such compounds. Moreover, the silicone-based compounds have high refractive indices. Since the refractive index of a coating depends upon the refractive indices of its components, these silicone-based compounds are useful as components of high gloss coatings.

Accordingly, one embodiment of the invention is a compound represented by the formula:

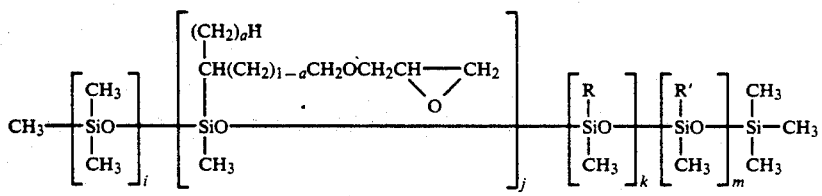

(I)

wherein:
(a) each R in the compound is independently 1-phenylethyl, 2-phenylethyl, 2-phenylpropyl, or 1-methyl-1-phenylethyl;
(b) each R' in the compound is independently alkyl containing from 6 to 18 carbon atoms;
(c) the average value of a is in the range of from 0 to 1;
(d) the value of i is an integer in the range of from 0 to about 200;
(e) the value of j is an integer in the range of from about 2 to about 20;
(f) the value of k is an integer in the range of from about 2 to about 60;
(g) the ratio k/j is in the range of from 1 to about 10;
(h) the sum of the values of i, j, k, and m is in the range of from about 10 to about 280; and
(i) the value of m is an integer such that m/(j+k+m) is in the range of from 0 to about 0.15.

Another embodiment of the invention is a mixture of siloxane compounds, which mixture is represented by Formula (I) wherein:
(a) each R of each siloxane compound constituting the mixture is independently 1-phenylethyl, 2-phenylethyl, 2-phenylpropyl, or 1-methyl-1-phenylethyl;
(b) each R' of each siloxane compound constituting the mixture is independently alkyl containing from 6 to 18 carbon atoms;
(c) the average value of a is in the range of from 0 to 1;
(d) the average value of i is in the range of from 0 to about 200;
(e) the average value of j is in the range of from about 2 to about 20;
(f) the average value of k is in the range of from about 2 to about 60;
(g) the ratio k/j is in the range of from 1 to about 10;
(h) the sum of the average of i, j, k, and m is in the range of from about 10 to about 280; and
(i) the average value of m is such that m/(j+k+m) is in the range of from 0 to about 0.15.

Yet another embodiment of the invention is a compound represented by the formula:

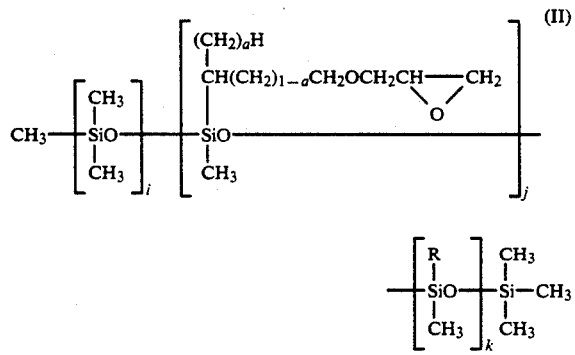

(II)

herein: (a) each R in the compound is independently 1-phenylethyl, 2-phenylethyl, 2-phenylpropyl, or 1-methyl-1-phenylethyl; (b) the average value of a is in the range of from 0 to 1; (c) the value of i is an integer in the range of from 0 to about 200; (d) the value of j is an integer in the range of from about 2 to about 20; (e) the value of k is an integer in the range of from about 2 to about 60; (f) the ratio k/j is in the range of from 1 to about 10; and (g) the sum of the values of i, j, and k is in the range of from about 10 to about 280.

Another embodiment of the invention is a mixture of siloxane compounds, which mixture is represented by Formula (I) wherein: (a) each R of each siloxane compound constituting the mixture is independently 1-phenylethyl, 2-phenylethyl, 2-phenylpropyl, or 1-methyl-1-phenylethyl; (b) the average value of a is in the range of from 0 to 1; (c) the average value of i is in the range of from 0 to about 200; (d) the average value of j is in the range of from about 2 to about 20; (e) the average value of k is in the range of from about 2 to about 60; (f) the ratio k/j is in the range of from 1 to about 10; and (g) the sum of the average values of i, j, and k is in the range of from about 10 to about 280.

Formula (I) and Formula (II) are diagrammatic, and it is not intended to imply that the parenthetical portions are necessarily blocks, although blocks may be used where desired. In many cases the compound is more or less random, especially when more than a few siloxane units are employed and when mixtures are used. In those instances where more than a few siloxane units are used and it is desired to form blocks, oligomers are first formed and then these are joined to form the block compound. By the judicious choice of reactants, compounds having an alternating structure or blocks of alternating structure may be used.

Each R of each siloxane compound is independently 1-phenylethyl, 2-phenylethyl, 2-phenylpropyl, or 1-methyl-1-phenylethyl. The R groups of the molecule may be the same or they may be different. When the siloxane is prepared by reacting methylhydrosiloxane functionality with styrene and/or α-methylstyrene, the identities of the individual R groups will be determined by the manner in which the addition reaction occurs. For most purposes it is not necessary to analyze the compounds and mixtures of the invention for the identities and proportions of the individual R groups, it being satisfactory to utilize the compounds and mixtures as formed by the reaction. The preferred R group is 2-phenylpropyl.

Each R' of each siloxane compound is independently alkyl containing from 6 to 18 carbon atoms. The R' groups of the molecule may be the same or they may be different. Each alkyl may individually be a straight chain alkyl or it may be a branched alkyl. When the siloxane is prepared by reacting methylhydrosiloxane functionality with an olefin containing from 6 to 18 carbon atoms, the identities of the individual R' groups will be determined by the manner in which the addition reaction occurs. For most purposes it is not necessary to analyze the compounds and mixtures of the invention for the identities and proportions of the individual R' groups, it being satisfactory to utilize the compounds and mixtures as formed by the reaction. The preferred olefins are the α-olefins containing from 6 to 18 carbon atoms. The preferred α-olefin is 1-octene. The preferred R' groups are octyl and 1-methylheptyl. Octyl is especially preferred.

The value of a for any individual epoxy-functional siloxane unit will be either 0 or 1. The average value of a for compounds or mixtures of compounds of the invention may be may be a whole or fractional number in the range of from 0 to 1. When the siloxane is prepared by reacting methylhydrosiloxane functionality with allyl glycidyl ether, the value of a will be determined by the distribution resulting from the manner in which the addition reaction occurs. For most purposes it is not necessary to analyze these compounds or mixtures of compounds for the average value of a, it being satisfactory to utilize the compounds and mixtures as formed by the reaction. Nevertheless, it is permissible, and sometimes desirable, to modify the average value of a by adding appropriate amounts of specific compounds within Formula (I) or Formula (II) as the case may be.

It will be appreciated that when the value of m is zero, Formula (I) and Formula (II) are the same.

The values of i, j, k, and m for any particular siloxane compound will be positive integers, while the average values of i, j, k, and m for a mixture of siloxane compounds may independently be positive integers or positive numbers which are not integers.

For the compounds of the invention, the value of i is in the range from 0 to about 200. Often the value of i is in the range of from about 5 to about 100. From about 10 to about 30 is preferred. The value of j is in the range of from about 2 to about 20. In many cases the value of j is in the range of from about 2 to about 10. From about 3 to about 6 is preferred. The value of k is in the range of from about 2 to about 60. Frequently the value of k is in the range of from about 4 to about 40. From about 5 to about 25 is preferred. The sum of the values of i, j, k, and m is in the range of from about 10 to about 280. Often the sum is in the range of from about 11 to about 150. From about 18 to about 61 is preferred.

For the mixtures of the invention, the average value of i is in the range from 0 to about 200. Often the average value of i is in the range of from about 5 to about 100. From about 10 to about 30 is preferred. The average value of j is in the range of from about 2 to about 20. In many cases the average value of j is in the range of from about 2 to about 10. From about 3 to about 6 is preferred. The average value of k is in the range of from about 2 to about 60. Frequently the average value of k is in the range of from about 4 to about 40. From about 5 to about 25 is preferred. The sum of the average values of i, j, k, and m is in the range of from about 10 to about 280. Often the sum is in the range of from about 11 to about 150. From about 18 to about 61 is preferred.

For the compounds and mixtures of the invention, the ratio k/j is in the range of from about 1 to about 10. Often the ratio is in the range of from about 1 to about 8. From about 2 to about 5 is preferred.

For the compounds and mixtures of the invention represented by Formula (I), the value of m is such that $m/(j+k+m)$ is in the range of from 0 to about 0.15. Often the value of m is such that $m/(j+k+m)$ is in the range of from 0 to about 0.1. Preferably the value of m is such that $m/(j+k+m)$ is in the range of from about 0 to about 0.05. Frequently the value of m is such that $m/(j+k+m)$ is in the range of from about 0.001 to about 0.15. In many cases the value of m is such that $m/(j+k+m)$ is in the range of from about 0.005 to about 0.1. It is especially preferred that the value of m is such that $m/(j+k+m)$ is in the range of from about 0.01 to about 0.05.

The values or average values of i, j, k, and m may be ascertained from analytical information, knowledge of the structures of the reactants, knowledge of the proportions of reactants, knowledge of the reaction mechanism, knowledge of the reaction procedure, or various combinations of these. When an average molecular weight of a mixture of compounds is used in the determination, the number average molecular weight should be employed. The number average molecular weight may be found experimentally or it may be calculated from the distribution of individual compounds using the equalities:

$$M_n = \frac{\Sigma M_q N_q}{\Sigma N_q} = \frac{\Sigma w_q}{\Sigma m_q}$$

where
$\overline{Mm}_n$ is the number average molecular weight;

$M_q$ is the molecular weight of molecules of species q;
$N_q$ is the number of molecules of species q;
$w_q$ is the mass, expressed in grams, of molecules of species q; and
$m_q$ is the mass, expressed in gram-moles, of molecules of species q.

The mixtures of the invention represented by Formula (I) may optionally comprise materials other than the siloxane compounds discussed above. Nevertheless, average values of a, i, j, k, and m for the mixture are determined only in respect of those compounds having the structure of Formula (I) in which the values of a, i, j, k, and m for compounds constituting the mixtures are as discussed above.

The mixtures of the invention represented by Formula (II) may optionally comprise materials other than the siloxane compounds discussed above. Nevertheless, average values of a, i, j, and k for the mixture are determined only in respect of those compounds having the structure of Formula (II) in which the values of a, i, j, and k for compounds constituting the mixture are as discussed above.

The compounds and mixtures of the invention represented by Formula (I) may be prepared by reacting one or more bis(triethyl)-terminated, methyl-functional, hydro-functional polysiloxane compounds with a molar deficiency of styrene and/or α-methylstyrene followed by reaction of a portion of the remaining methylhydrosiloxane functionality with allyl glycidyl ether, followed by reaction of the remaining methylhydrosiloxane functionality with olefin containing from 6 to 18 carbon atoms. One olefin or a mixture of olefins may be used as desired.

The compounds and mixtures of the invention represented by Formula (II) may be prepared by reacting one or more bis(trimethyl)-terminated, methyl-functional, hydro-functional polysiloxane compounds with a molar deficiency of styrene and/or α-methylstyrene followed by reaction of the remaining methylhydrosiloxane functionality with allyl glycidyl ether.

The bis(trimethyl)-terminated, methyl-functional, hydro-functional polysiloxane compounds may be prepared by any method known in the art. A preferred method is to equilibrate a mixture of octamethylcyclotetrasiloxane [CAS 556-67-2] and poly(methylhydrosiloxane) [CAS 9004-73-31] in the presence of an acid catalyst. Hexamethyldisiloxane [CAS 107-46-0] may be used in lieu of all or a portion of the octamethylcyclotetrasiloxane. The equilibration may be conducted by recycling the reactants through a bed of acidic sulfonated polystyrene ion exchange resin beads (e.g., Amberlyst ® A-15 resin; Rohm & Haas Company) at about 60° C. for about 24 hours, or by stirring the reactants and about ½ percent by weight, based on the reactants, of trifluromethanesulfonic acid at about 60° C. for about 24 hours. In either case, the relative proportions of reactants are chosen so as to provide the appropriate ratios of dimethylsiloxane units and methylhydrosiloxane units to the copolymer.

The adduct of the above copolymer and a molar deficiency of styrene and/or α-methylstyrene is ordinarily prepared by reaction in the liquid phase and in the presence of a catalyst such as chloroplatinic acid. Usually the reaction is conducted at temperatures in the range of from about 20° C. to about 250° C. From about 80° C. to about 140° C. is preferred. Although superatmospheric or subatmospheric pressures may be used, the reaction is most often conducted at about ambient atmospheric pressure. The relative proportions of reactants are chosen so as to provide the appropriate ratios of dimethylsiloxane units, methylhydrosiloxane units, and —(CH$_3$)(R)SiO— units to the adduct.

When the product of Formula (I) is to be prepared where the value of m is greater than zero, an intermediate is usually first prepared by reacting the above adduct and a molar deficiency of allyl glycidyl ether in the liquid phase and in the presence of a catalyst such a chloroplatinic acid. Usually the reaction is conducted at temperatures in the range of from about 20° C. to about 250° C. From about 80° C. to about 140° C. is preferred. Although superatmospheric or subatmospheric pressures may be used, the reaction is most often conducted at about ambient atmospheric pressure. The relative proportions of reactants are chosen so that some of the remaining hydrogen groups attached directly to silicon atoms of the adduct will not be converted to 3-(oxiranylmethoxy)propyl groups and/or 1-methyl-2-(oxiranylmethyoxy)ethyl groups. The product of Formula (I) is then prepared by reacting the intermediate and olefin in the liquid phase and in the presence of a catalyst such as chloroplatinic acid. Usually the reaction is conducted at temperatures in the range of from about 20° C. to about 165° C. From about 80° C. to about 150° C. is preferred. Although superatmospheric or subatmospheric pressure may be used, the reaction is most often conducted at about ambient atmospheric pressure. The relative proportions of reactants are chosen so that substantially all of the remaining hydrogen groups attached directly to silicon atoms of the intermediate will be converted to alkyl groups and so that m/(j+k+m) will be in the range of from greater than zero to about 0.15. In most instances the ratio of equivalents of the olefin to the equivalents of the intermediate is in the range of from 1.01:1 to about 2:1. From about 1.1:1 to about 1.5:1 is preferred.

The product of Formula (II) is usually prepared by reacting the adduct heretofore described and allyl glycidyl ether in the liquid phase and in the presence of a catalyst such as chloroplatinic acid. Usually the reaction is conducted at temperatures in the range of from about 20° C. to about 250° C. From about 80° C. to about 140° C. is preferred. Although superatmospheric or subatmospheric pressures may be used, the reaction is most often conducted at about ambient atmospheric pressure. The relative proportions of reactants are chosen so that substantially all of the remaining hydrogen groups attached directly to silicon atoms of the adduct will be converted to 3-(oxiranylmethoxy)propyl groups and/or 1-methyl-2-(oxiranylmethoxy)ethyl groups. In most instances the ratio of equivalents of allyl glycidyl ether to the equivalents of adduct is in the range of from 1.01:1 to about 2:1. From about 1.1:1 to about 1.2:1 is preferred.

The silicone compounds and mixtures of compounds of this invention may be used as components of coating compositions. The type of coating composition may vary widely, but usually it will be an acrylic, polyester, melamine, or a hybrids of two or more types. In most cases the resin possesses acid functionality in order to promote reaction of the epoxy groups of the silicones of the present invention with the resin. The coating compositions may be prepared by simply admixing the various ingredients.

When the silicone compounds and mixtures of silicone compounds of this invention are employed as components of coating compositions, they ordinarily constitute from about 0.05 to about 5 percent by weight of the resin of the coating composition. From about 0.1 to about 2 percent by weight is preferred.

The refractive indices of the silicone compounds and mixtures of silicone compounds of this invention are such that they are useful as optical coupler adhesives or as components of such adhesives.

The invention is further described in conjunction with the following examples which are to be considered illustrative rather than limiting, and in which all parts are parts by weight and all percentages are percentages by weight unless otherwise specified.

EXAMPLE 1

A 2-liter reaction flask equipped with two addition funnels, a thermometer, a stirrer, a reflux condenser and trap, and an electric heating mantle was charged with 501.4 grams of α-methylstyrene. The α-methylstyrene was heated to reflux and about 30 milliliters was distilled off. One addition funnel was charged with 465.3 grams of a bis(trimethyl)-terminated, methyl-functional, hydro-functional polysiloxane having a kinematic viscosity of about 80 centistokes at 25° C. wherein the ratio of methylhydrosiloxane units to dimethylsiloxane units was about 2:1. Thirty microliters of eugenol was added to the reaction flask and the reaction mixture was cooled to 120° C. About one-tenth of the polysiloxane in the addition funnel and 47 microliters of a chloroplatinic acid solution (7.5 percent $H_2PtCl_6$ in isopropanol) were added. An exotherm was observed. The heating mantle was removed and the polysiloxane remaining in the addition funnel was added quickly while keeping the temperature at 131°±2° C. with air jets for additional cooling. Upon completion of the addition the heating mantle was replaced. The reaction mixture was stirred at 125° C. overnight. Analysis showed that the α-methylstyrene had reacted quantitatively. Next, 148.7 grams of allyl glycidyl ether was added slowly. A mild exotherm was observed. The reaction mixture was then heated to 140° C. and stirred at that temperature for six hours. When the IR band for Si-H had substantially disappeared, the solution was cooled to 80° C. and stirred with 20 grams of magnesium silicate and 10 grams of water for 2 hours. The flask was heated to 110° C. and the water was distilled off. The flask was then heated to 160° C. at an absolute pressure of from 400 to 2666 pascals and the unreacted alkenes were sparged off with nitrogen. The solution was cooled and filtered to yield a yellow viscous liquid containing 5% epoxy taken as

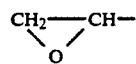

EXAMPLE 2

To 2740 grams alpha-methylstyrene in a 12 liter flask at 120° C. was rapidly added 3000 grams of a silicone pre-polymer composed of 62 mole percent methylhydrosiloxane units and 31 mole percent dimethylsiloxane units with 7 mole percent hexamethyldisiloxane end-cap in the presence of 2.5 ppm platinum catalyst (from chloroplatinic acid). The solution was stirred at 140° C. for four hours and then cooled to 120° C. Allyl glycidyl ether, 1016 grams was added over 1.5 hours. The solution was stirred for an additional two hours at 120° C. and then heated to 140° C. overnight. In the morning, 262 grams of 1-octene were added to react the remaining 10 percent methylhydrosiloxane units. Solution was stirred for 3 hours and then cooled to 90° C. When cools, 180 grams $MgSiO_3$ and 95 grams water were added to the flask and then stirred at that temperature for 4 hours. The solution was filtered and stripped to yield about 7 kilograms of epoxy-functional silicone as a homogeneous viscous liquid.

Although the present invention has been described with reference to specific details of certain embodiments thereof, it is not intended that such details should be regarded as limitations upon the scope of the invention except insofar as they are included in the accompanying claims.

I claim:

1. A compound represented by the formula:

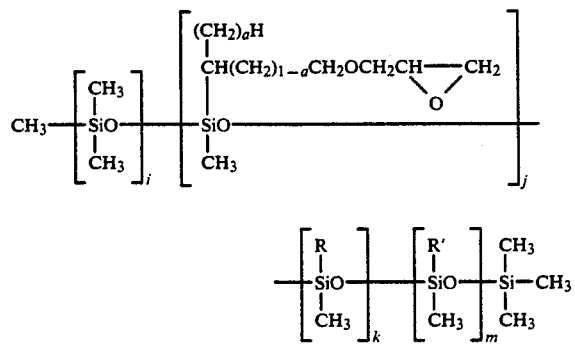

wherein:
(a) each R in the compound is independently 1-phenylethyl, 2-phenylethyl, 2-phenylpropyl, or 1-methyl-1-phenylethyl;
(b) each R' in the compound is independently alkyl containing from 6 to 18 carbon atoms;
(c) the average value of a is in the range of from 0 to 1;
(d) the value of i is an integer in the range of from 0 to about 200;
(e) the value of j is an integer in the range of from about 2 to about 20;
(f) the value of k is an integer in the range of from about 2 to about 60;
(g) the ratio k/j is in the range of from 1 to about 10;
(h) the sum of the values of i, j, k, and m is in the range of from about 10 to about 280; and
(i) the value of m is an integer such that $m/(j+k+m)$ is in the range of from 0 to about 0.15.

2. The compound of claim I wherein each R in the compound is independently 2-phenylpropyl or 1-methyl-1-phenylethyl.

3. The compound of claim 1 wherein the ratio k/j is in the range of from about 1 to about 8.

4. The compound of claim 1 wherein the ratio k/j is in the range of from about 2 to about 5.

5. The compound of claim 1 wherein the value of m is an integer such that $m/(j+k+m)$ is in the range of from about 0.001 to about 0.15.

6. The compound of claim 1 wherein:
(a) the value of i is an integer in the range of from about 5 to about 100;
(b) the value of j is an integer in the range of from about 2 to about 10;
(c) the value of k is an integer in the range of from about 4 to about 40; and.

(d) the sum of the values of i, j, k, and m is in the range of from about 11 to about 150.

7. The compound of claim 6 wherein each R in the compound is independently 2-phenylpropyl or 1-methyl-1-phenylethyl.

8. The compound of claim 7 wherein the ratio k/j is in the range of from about 1 to about 8.

9. The compound of claim 7 wherein the ratio k/j is in the range of from about 2 to about 5.

10. The compound of claim 7 wherein the value of m is an integer such that m/(j+k+m) is in the range of from about 0.005 to about 0.1.

11. The compound of claim 1 wherein:
(a) the value of i is an integer in the range of from about 10 to about 30;
(b) the value of j is an integer in the range of from about 3 to about 6; and
(c) the value of k is an integer in the range of from about 5 to about 25;
(d) the sum of the values of i, j, k, and m is in the range of from about 18 to about 61.

12. The compound of claim 11 wherein each R in the compound is independently 2-phenylpropyl or 1-methyl-1-phenylethyl.

13. The compound of claim 12 wherein the ratio k/j is in the range of from about 1 to about 8.

14. The compound of claim 12 wherein the ratio k/j is in the range of from about 2 to about 5.

15. The compound of claim 12 wherein the value of m is an integer such that m/(j+k+m) is in the range of from about 0.01 to about 0.05.

16. A mixture of siloxane compounds, which mixture is represented by the formula:

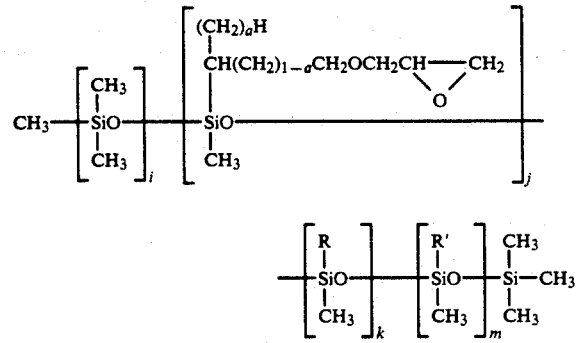

wherein:
(a) each R of each siloxane compound constituting the mixture is independently 1-phenylethyl, 2-phenylethyl, 2-phenylpropyl, or 1-methyl-1-phenylethyl;
(b) each R' of each siloxane compound constituting the mixture is independently alkyl containing from 6 to 18 carbon atoms;
(c) the average value of a is in the range of from 0 to 1;
(d) the average value of i is in the range of from 0 to about 200;
(e) the average value of j is in the range of from about 2 to about 20;
(f) the average value of k is in the range of from about 2 to about 60;
(g) the ratio k/j is in the range of from 1 to about 10;
(h) the sum of the average values of i, j, k, and m is in the range of from about 10 to about 280; and
(i) the average value of m is such that m/(j+k+m) is in the range of from 0 to about 0.15.

17. The mixture of claim 16 wherein each R of each siloxane compound constituting the mixture is independently 2-phenylpropyl or 1-methyl-1-phenylethyl.

18. The mixture of claim 16 wherein the ratio k/j is in the range of from about 1 to about 8.

19. The mixture of claim 16 wherein the ratio k/j is in the range of from about 2 to about 5.

20. The mixture of claim 16 wherein the average value of m is such that m/(j+k+m) is in the range of from about 0.001 to about 0.15.

21. The mixture of claim 16 wherein:
(a) the average value of i is in the range of from about 5 to about 100;
(b) the average value of j is in the range of from about 2 to about 10;
(c) the average value of k is in the range of from about 4 to about 40; and
(d) the sum of the average values of i, j, k, and m is in the range of from about 11 to about 150.

22. The mixture of claim 21 wherein each R of each siloxane compound constituting the mixture is independently 2-phenylpropyl or 1-methyl-1-phenylethyl.

23. The mixture of claim 22 wherein the ratio k/j is in the range of from about 1 to about 8.

24. The mixture of claim 22 wherein the ratio k/j is in the range of from about 2 to about 5.

25. The mixture of claim 22 wherein the average value of m is such that m/(j+k+m) is in the range of from about 0.005 to about 0.1.

26. The mixture of claim 16 wherein:
(a) the average value of i is in the range of from about 10 to about 30;
(b) the average value of j is in the range of from about 3 to about 6;
(c) the average value of k is in the range of from about 5 to about 25; and
(d) the sum of the average values of i, j, k, and m is in the range of from about 18 to about 61.

27. The mixture of claim 26 wherein each R of each siloxane compound constituting the mixture is independently 2-phenylpropyl or 1-methyl-1-phenylethyl.

28. The mixture of claim 27 wherein the ratio k/j is in the range of from about 1 to about 8.

29. The mixture of claim 27 wherein the ratio k/j is in the range of from about 2 to about 5.

30. The mixture of claim 27 wherein the average value of m is such that m/(j+k+m) is in the range of from about 0.01 to about 0.05.

31. A compound represented by the formula:

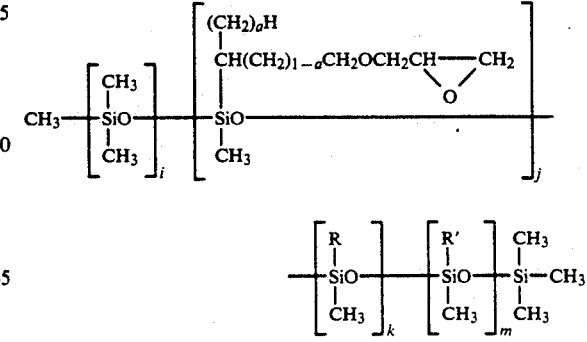

wherein: p1 (a) each R in the compound is independently 1-phenylethyl, 2-phenylethyl, 2-phenylpropyl, or 1-methyl-1-phenylethyl;

(b) the average value of a is in the range of from 0 to 1;

(c) the value of i is an integer in the range of from 0 to about 200;

(d) the value of j is an integer in the range of from about 2 to about 20;

(e) the value of k is an integer in the range of from about 2 to about 60;

(f) the ratio k/j is in the range of from 1 to about 10; and (g) the sum of the values of i, j, and k is in the range of from about 10 to about 280.

32. The compound of claim 31 wherein each R in the compound is independently 2-phenylpropyl or 1-methyl-1-phenylethyl.

33. The compound of claim 32 wherein the ratio k/j is in the range of from about 2 to about 5.

34. A mixture of siloxane compounds, which mixture is represented by the formula:

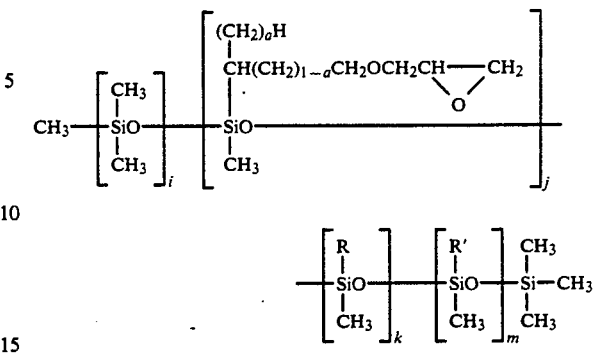

wherein:
(a) each R of each siloxane compound constituting the mixture is independently 1-phenylethyl, 2-phenylethyl, 2-phenylpropyl, or 1-methyl-1-phenylethyl;

(b) the average value of a is in the range of from 0 to 1;

(c) the average value of i is in the range of from 0 to about 200;

(d) the average value of j is in the range of from about 2 to about 20;

(e) the average value of k is in the range of from about 2 to about 60;

(f) the ratio k/j is in the range of from 1 to about 10; and (g) the sum of the average values of i, j, and k is in the range of from about 10 to about 280.

35. The mixture of claim 34 wherein each R of each siloxane compound constituting the mixture is independently 2-phenylpropyl or 1-methyl-1-phenylethyl.

36. The mixture of claim 35 wherein the ratio k/j is in the range of from about 2 to about 5.

* * * * *

UNITED STATES PATENT AND TRADEMARK OFFICE
CERTIFICATE OF CORRECTION

PATENT NO. : 5,248,789
DATED : September 28, 1993
INVENTOR(S) : Andrew R. Wolff

Page 1 of 2

It is certified that error appears in the above-indentified patent and that said Letters Patent is hereby corrected as shown below:

Column 10, claim 31, lines 63-67, delete

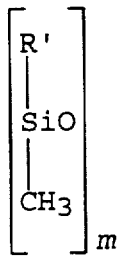

from the formula.

UNITED STATES PATENT AND TRADEMARK OFFICE
CERTIFICATE OF CORRECTION

PATENT NO. : 5,248,789
DATED : September 28,1993
INVENTOR(S) : Andrew R. Wolff

It is certified that error appears in the above-indentified patent and that said Letters Patent is hereby corrected as shown below:

Column 12, claim 34, lines 11-15, delete

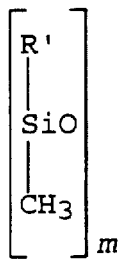

from the formula.

Signed and Sealed this

Twelfth Day of March, 1996

Attest:

BRUCE LEHMAN

*Attesting Officer*  *Commissioner of Patents and Trademarks*